(12) United States Patent
Dunne et al.

(10) Patent No.: US 6,394,543 B1
(45) Date of Patent: May 28, 2002

(54) COVERING FOR CHILD'S SEATING DEVICE

(75) Inventors: Debra Dunne, Trabuco Canyon; Laura Hastings, Mission Viejo, both of CA (US)

(73) Assignee: Crown Craft Infant Products, Huntington Beach, CA (US)

(*) Notice: Subject to any disclaimer, the term of this patent is extended or adjusted under 35 U.S.C. 154(b) by 0 days.

(21) Appl. No.: 09/694,118

(22) Filed: Oct. 20, 2000

(51) Int. Cl.7 ............................................. A47C 31/00
(52) U.S. Cl. ........................ 297/219.12; 297/229; 5/482
(58) Field of Search ........................ 297/219.1, 219.12, 297/224, 225, 228.11, 228.13, 229, 250.1, 464, 485, 184.13; 5/482, 655; 2/69, 69.5

(56) References Cited

U.S. PATENT DOCUMENTS

| | | |
|---|---|---|
| 3,477,065 A | 11/1969 | Hoover |
| 4,172,300 A | 10/1979 | Miller |
| 4,478,453 A | 10/1984 | Schutz |
| 4,632,460 A | 12/1986 | Meeker et al. |
| 4,634,177 A | 1/1987 | Meeker |
| 4,909,574 A | 3/1990 | Sedlack |
| 4,946,221 A | 8/1990 | Livingston |
| 4,958,886 A * | 9/1990 | Barattini et al. ........ 297/224 X |
| 4,993,090 A | 2/1991 | Ranalli |
| 5,011,221 A | 4/1991 | Wise |
| 5,058,226 A | 10/1991 | Crosby |
| 5,082,325 A | 1/1992 | Sedlack |
| 5,103,514 A | 4/1992 | Leach |
| 5,127,120 A | 7/1992 | Mason |
| 5,129,406 A | 7/1992 | Magnusen et al. |
| 5,150,945 A * | 9/1992 | Aupperlee et al. .. 297/219.12 X |
| 5,238,293 A | 8/1993 | Gibson |
| 5,243,724 A | 9/1993 | Barnes |
| 5,309,586 A | 5/1994 | Sies et al. |
| 5,432,965 A | 7/1995 | Espinoza |
| 5,551,109 A * | 9/1996 | Tingley et al. .................. 6/655 |
| 5,551,751 A | 9/1996 | Sedlack et al. |
| 5,626,397 A * | 5/1997 | Reid ....................... 297/229 X |
| 5,662,380 A * | 9/1997 | Tam et al. .......... 297/219.12 X |
| 5,781,946 A | 7/1998 | McEntire et al. |
| 5,897,164 A | 4/1999 | Kagan et al. |
| 5,950,261 A | 9/1999 | Hay et al. |
| 5,954,404 A * | 9/1999 | Suzuki .............. 297/219.12 X |
| 5,988,742 A * | 11/1999 | Stevens ................. 297/219.12 |
| 6,009,576 A * | 1/2000 | Gramme et al. ............ 5/655 X |
| 6,036,260 A | 3/2000 | Mullen |
| 6,055,686 A * | 5/2000 | Knight ....................... 5/655 X |

\* cited by examiner

Primary Examiner—Peter M. Cuomo
Assistant Examiner—Stephen Vu
(74) Attorney, Agent, or Firm—Knobbe, Martens, Olson & Bear, LLP (57) ABSTRACT

A covering for children's seating devices such as car seats, strollers, swings, infant carriers or the like includes a main body portion forming a pocket that fits over a seating device, and at least one blanket flap portion provided inset from a side of the main body portion. The blanket flap portion is foldably coupled to the main body portion to cover a child seated in the seating device when inwardly folded. Once the covering has been fastened to the seating device, a child is placed thereon so that the rear of the child comes into contact with the main body portion, which covers the seating device. Harness straps of the seating device, which serve to secure the child within the seating device, can be engaged through a divided opening through the main body portion prior to fitting it over the seat. The blanket flap portion is then folded over the body of the child so as to insulate the child in the manner of a blanket.

10 Claims, 6 Drawing Sheets

COVERING FOR CHILD'S SEATING DEVICE

FIELD OF THE INVENTION

The invention relates generally to a covering for seating devices for children, and more particularly relates to a covering which can be easily secured to a typical seating device for infants or young children, such as a car seat, stroller, swing, infant carrier, etc., and which facilitates the covering of the child while seated.

BACKGROUND AND SUMMARY OF THE INVENTION

Young children are especially sensitive to variations in temperature as a result of their insufficiently developed hypothalamic temperature regulation mechanisms and relatively high skin surface area to body mass ratio. As a result, it is generally advisable to wrap such small children in blankets or the like even at temperatures which most adults would perceive to be pleasantly cool. However, this can present problems when young children are seated in stationary seating devices or are conveyed in portable seating devices such as infant carriers, strollers, car seats, or the like. The use of separate blankets with such seating devices is often cumbersome, requiring the tucking of the ends of such blankets into insufficient spaces beneath or next to the child, which is often unsatisfactory from the point of view of insulation, since gaps are often present through which cold air may pass. In addition, the presence of the tucked-in blanket is often uncomfortable for the child. However, if the blanket is not tucked in, it may easily be kicked off by the child or be caught in the wheels of a stroller or the like.

Various prior art coverings have attempted to solve this problem. A typical prior art covering fits over the seating device and attaches to it by means of an elastic periphery. An opening is provided for the head of the child, while a zipper extending downwardly from the opening facilitates access to the child. The inner side of such a covering is typically made from a soft material such as a cotton or polyester fleece.

However, such coverings are unsatisfactory for a number of reasons. A child seated with such a covering is often not directly in contact with the fleece material on the inside of the covering, and cold air may enter at the opening provided in the covering and lead to the loss of heat from the child's body. Additionally, it is somewhat cumbersome to place the child in the seating device or to remove it therefrom while the covering is attached, even when the zipper is opened fully. In addition, it is possible that the zipper itself may catch on the child's clothing, damaging it and possibly injuring the child. Alternatively, the covering may be removed before placing the child in the seating device, but the elastic periphery used to attach the covering to the seating device typically requires the application of some force, which is difficult when the child is in the seat, and the child may also be alarmed by the process of reattaching the covering. Furthermore, although such prior art coverings typically are provided with a soft material on the inner side thereof, this material only covers the front side of the seated child; on its rear side, the child comes into contact with the actual seating device, and it is often desirable that some soft, thermally insulating material be placed between the seating device and the child's rear side as well.

Additionally, some prior art coverings consist of blankets that are simply provided with holes that receive the straps of a seating device such as a car seat. However, such coverings are not fitted to the seating device, do not attach thereto, and are thus cumbersome to install, and the position thereof is likely to change as the child moves within the seating device.

There has, thus, been a need in the field for a covering for children's seating devices which allows easy access to children seated therein and yet is comfortable to the child. Desirably, the covering should be readily attachable to the child's seat.

In accordance with one aspect of the invention, a covering is provided for children's seating devices such as car seats, strollers, swings, infant carriers, or the like. The covering includes a main body portion which is configured to attach to the seating device, and at least one blanket flap portion provided at an interior part of the main body portion. The blanket flap portion is foldably coupled to the main body portion and sized such that the flap can cover a child seated in the seating device when the blanket flap portion is inwardly folded. A child is placed thereon so that the rear of the child comes into contact with the main body portion, which covers the seating device. The harness straps or the like of the seating device, if any, which serve to secure the child within the seating device, are then engaged, and the blanket flap portion is then folded.

In accordance with another aspect of the invention, a method is provided for insultating a child in a child's seating device. The method includes attaching a covering to the seating device. The covering includes a main body portion that forms a pocket sized and shaped to fit over the seating device, as well as least one blanket flap portion extending from the main body portion. The child is placed within the seating device over the main body portion of the covering, and the blanket flap portion is folded inwardly over the child.

BRIEF DESCRIPTION OF THE DRAWINGS

These and other features of the invention will now be described with reference to the drawings of one embodiment of the present covering for children's seating devices, which are intended to illustrate, but not to limit, the invention. The drawings contain the following figures.

DETAILED DESCRIPTION OF THE PREFERRED EMBODIMENT

FIGS. 1–6 illustrate a covering 50 for children's seating devices which is configured in accordance with a preferred embodiment of the present invention. The covering 50 is preferably employed with children's seating devices, more preferably with portable children's seating devices, and most preferably with children's car seats or infant carriers. As best seen from FIGS. 4–6, the covering 50 generally comprises a main body portion 52 and two blanket flap portions 54. The covering 50 is preferably made of soft, pliable materials, such as fabric made of cotton, polyester, or a cotton/polyester blend and in the illustrated embodiment is formed of fleece. The skilled artisan will readily appreciate, however, that various fabrics can be utilized without departing from the spirit and scope of the present invention.

Figure 4:
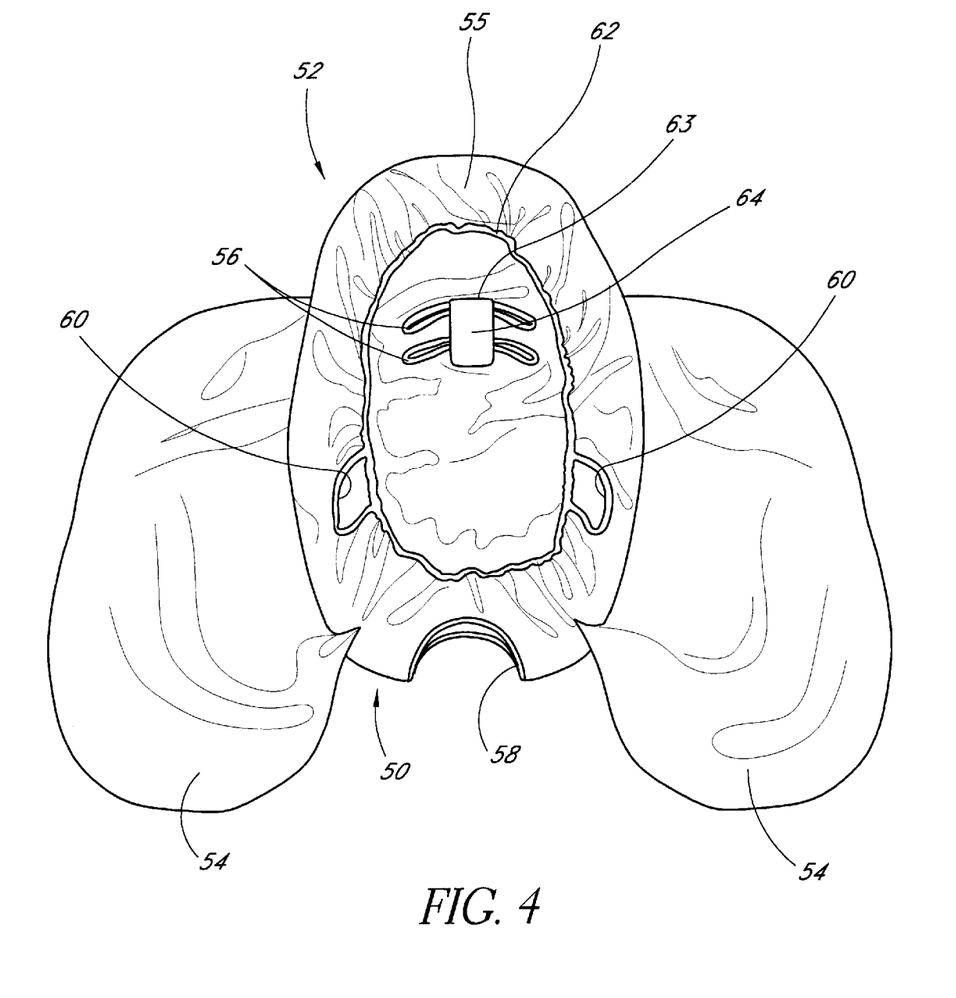
FIG. 4 is a bottom plan view of the covering of FIG. 1, with a first fastening element engaged.
Figure 5:
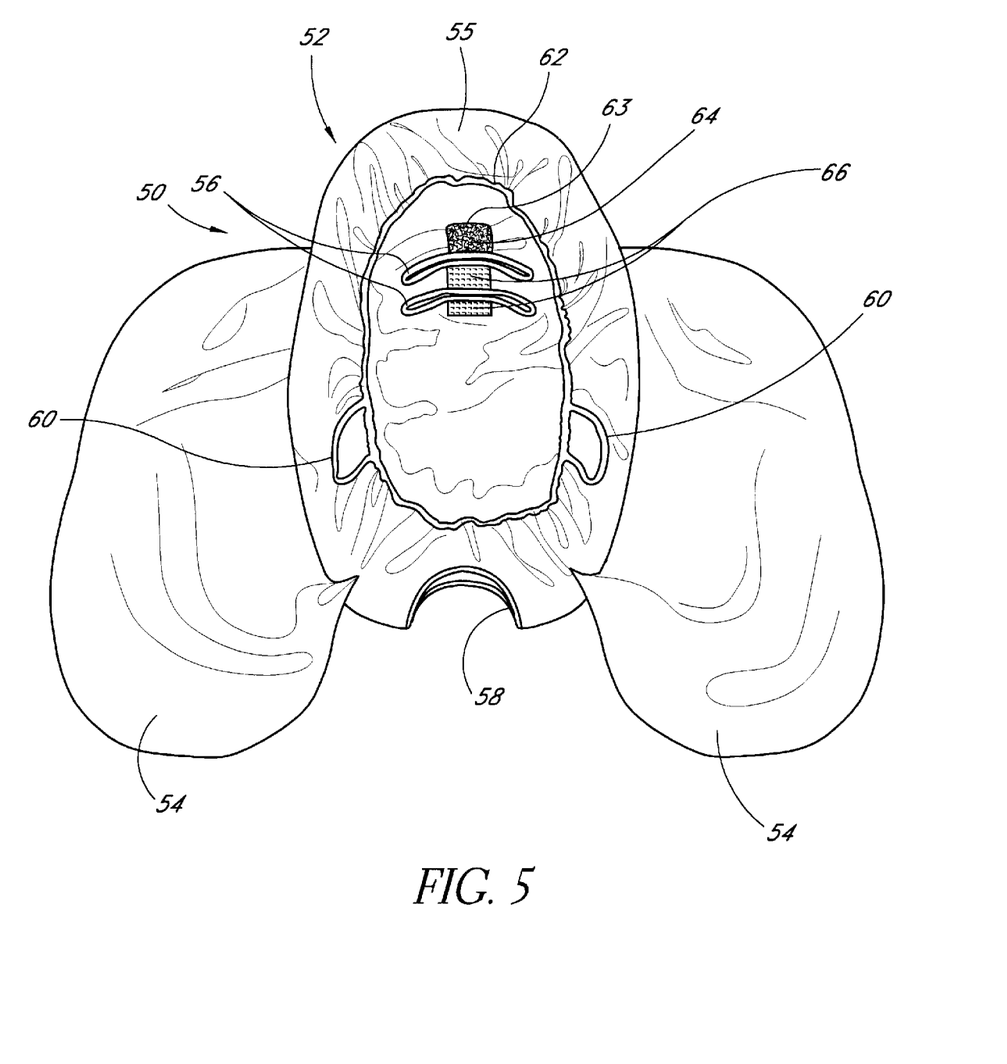
FIG. 5 is a bottom plan view of the covering of FIG. 1, with a first fastening element disengaged.

When viewed from the rear, as shown for example in FIGS. 4 and 5, the main body portion 52 has an approximately rectangular shape. The main body portion 52 is sized to permit attachment thereof to a variety of sizes of children's seating devices. Concretely, when viewed as shown in FIGS. 4 and 5, the size of the approximately rectangular outline thereof is preferably within a range of about 14–32 inches by about 9–21 inches (35.6–81.3 cm by 22.9–53.3 cm), more preferably within a range of about 17–29 inches by about 11–19 inches (43.2–73.7 cm by 27.9–48.3 cm), and most preferably within a range of about 20–26 inches by about 13–17 inches (50.8 . 66.0 cm by 33.0–43.2 cm). The blanket flap portions 54 attach to an inner part of the main body portion 52, defining a depending sidewall portion 55 of the main body portion 52. This depending sidewall 55 extends around the periphery of the main body portion 52 to define a pocket that depends from the flaps 54.

Figure 1:
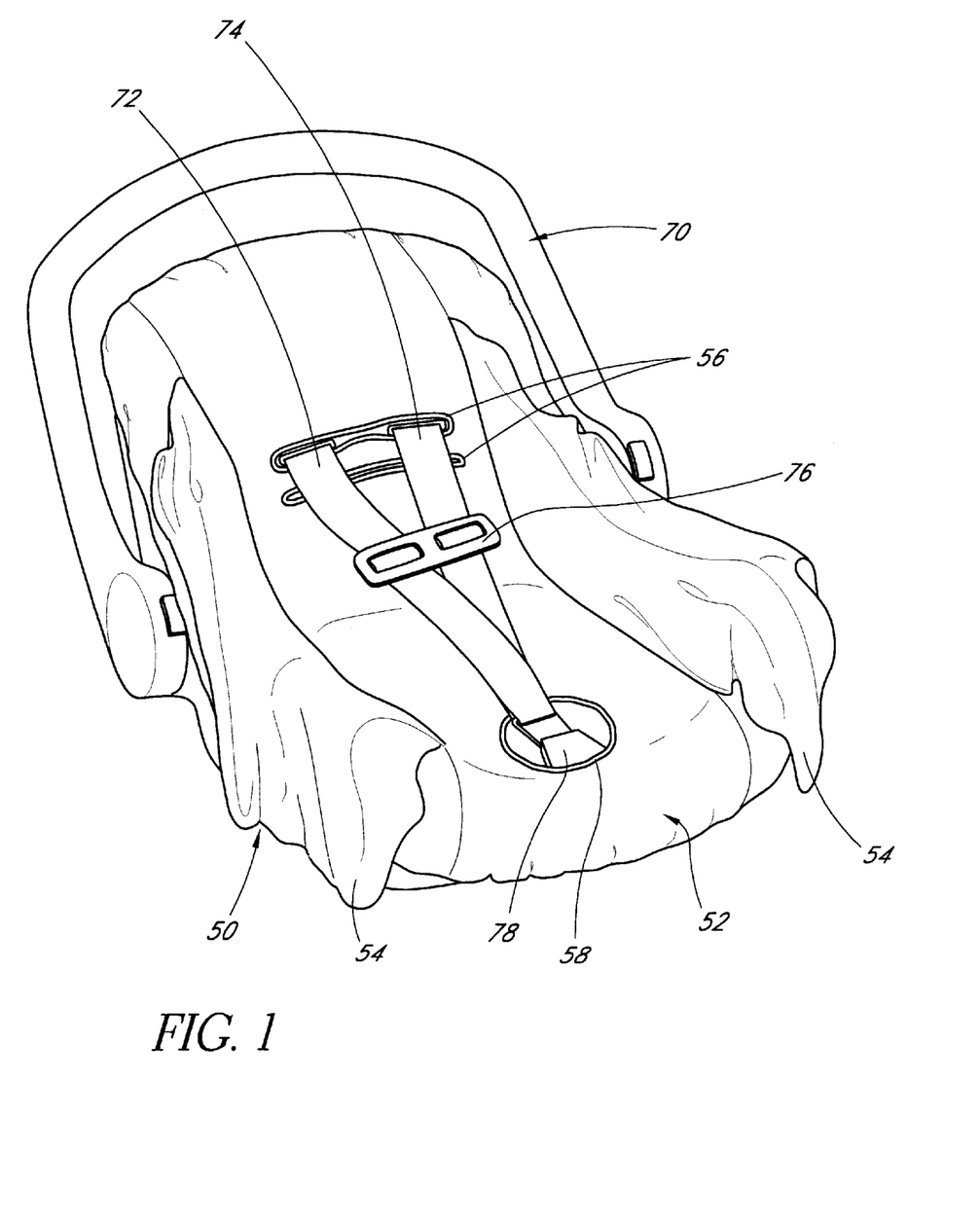
FIG. 1, is a top, left and front perspective view, illustrating a covering for children's seating devices fastened to a typical infant carrier device, constructed in accordance with a preferred embodiment of the present invention.
Figure 6:
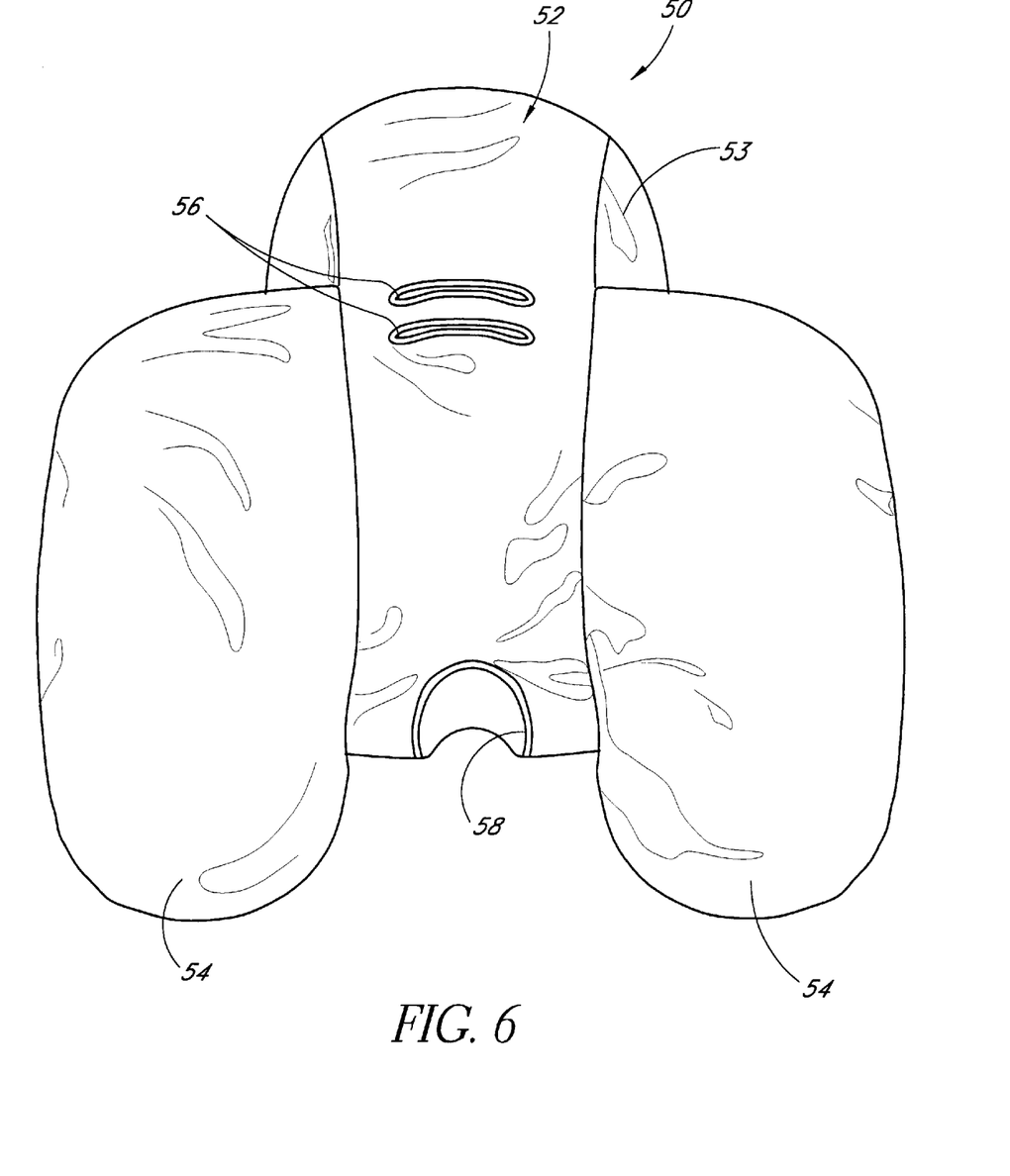
FIG. 6 is a top plan view of the covering of FIG. 1.

As shown in FIGS. 1 and 6, the main body portion 52 is provided with shoulder restraint openings 56, which are sized to receive the shoulder harness straps 72, 74 of an infant carrier or children's car seat. The shoulder restraint openings 56 preferably have a length within a range of about 3–14 inches (7.62–35.6 cm), more preferably within a range of about 4–10 inches (10.16–25.4 cm), and most preferably within a range of about 5–7 inches (12.7–17.8 cm). The fabric at the edges of shoulder restraint openings 56 may be rolled, serged, looped, trimmed with a contrasting fabric, finished in any other suitable manner or left unfinished. The provision of a plurality of such shoulder restraint openings allows adjusting of the placement of the covering on various seating devices. Two vertically-spaced shoulder restraint openings 56 are shown in the preferred embodiment; however, this is simply one example, and the skilled artisan will readily appreciate that one, three or more such shoulder restraint openings may be provided without departing from the spirit and scope of the present invention.

FIG. 4 shows a rear elevational view of the covering 50. A divider portion 63 is provided on the rear side of the main body portion 52, that is to say, on the side that comes into contact with a seating device when the covering 50 is installed on the seating device. In the preferred embodiment, the divider portion 63 is provided on the rear side of the main body portion 52; however, it is of course also possible to place the divider portion 63 on the front side of main body portion 52. The divider portion 63 is of sufficient length to transect all shoulder restraint openings 56; in the preferred embodiment, in which two shoulder restraint openings 56, 56 are provided, the divider portion 63 has a length of approximately 3 inches (7.62 cm). The divider portion 63 is positioned to transect all shoulder restraint openings 56 approximately at the longitudinal center of the shoulder restraint openings 56.

In the preferred embodiment, the divider portion 63 comprises a first fastener element 64, which is attached to the main body portion 52 at the upper edge of the upper shoulder restraint opening 56. In addition, second fastener elements 66 are provided at the rear of the main body portion 52. One second fastener element 66 is provided between shoulder restraint openings 56, while another second fastener element 66 is provided below the lower of the shoulder restraint openings 56. The second fastener elements 66 are provided at approximately the longitudinal center of the shoulder restraint openings 56 so as to coincide with the first fastener element 64 when the first fastener element 64 is engaged.

In the illustrated embodiment, the fastener elements comprise hook and loop material, such as Velcro™, with second fastener elements 66 comprising loop material and first fastener element 64 comprising hook material, though this arrangement can be readily reversed. First fastener element 64 is attached by sewing to the upper edge of the upper shoulder restraint opening 56; however, this first fastener element 64 may also be attached to the lower edge of the lower shoulder restraint opening 56. In this case, one of the second fastener elements is provided above the upper shoulder restraint opening to permit the engagement of the divider portion. Furthermore, the first fastener element 64 need not be sewn to the main body, but may be attached by other means known in the art, such as buttons, snaps, a zipper, or the like. Furthermore, the divider portion 63 need not necessarily comprise the first fastener element 64, nor need second fastener elements 66 be provided as described above; the skilled artisan will readily appreciate that other fastener elements, such as buttons, snaps, ties, or the like, may be employed without departing from the spirit and scope of the present invention.

As can be seen in FIG. 4, the main body portion 52 is also provided with an attaching portion 62, which serves to attach the covering 50 to a child's seating device. In the preferred embodiment, the attaching portion 62 comprises an elastic band gathering periphery of the main body portion 52 such that the sidewall portion 55 defines a pocket depending from the flaps 52.

In operation, the covering 50 is attached to the child's seating device by stretching the attaching portion 62 over the periphery of the seating device so that the covering remains attached to the seating device as a result of the tensile force of the elastic band of the attaching portion 62. Alternatively, the covering 50 can be attached by first turning the main body portion 52 inside out, then positioning the rear peripheral portion of the attaching portion 62 at the rear peripheral portion of the seating device, then progressively turning the main body portion 52 the right way out so that it progressively covers the seating device, like putting on a sock. In the preferred embodiment, the attaching portion 62 comprises an elastic band; however, the skilled artisan will readily appreciate that other mechanisms may be employed to wrap the main body portion 52 around the child seat without departing from the spirit and scope of the present invention. For example, ties, buttons, snaps, zippers, hook and loop material, or the like may be employed.

The main body portion 52 is further provided in the front portion thereof with a crotch buckle opening 58, as shown in FIG. 1. The crotch buckle opening 58 is large enough to accommodate the differing placement of crotch buckles on various children's seating devices. The crotch buckle opening 58 preferably has a diameter within a range of about 2–12 inches (5.08–30.5 cm), more preferably within a range of about 3–8 inches (7.62–20.3 cm), and most preferably within a range of about 4–6 inches (10.2–15.2 cm). The fabric at the edges of the crotch buckle opening 58 may be rolled, serged, looped, trimmed with a contrasting fabric, finished in any other suitable manner, or left unfinished.

Figure 3:
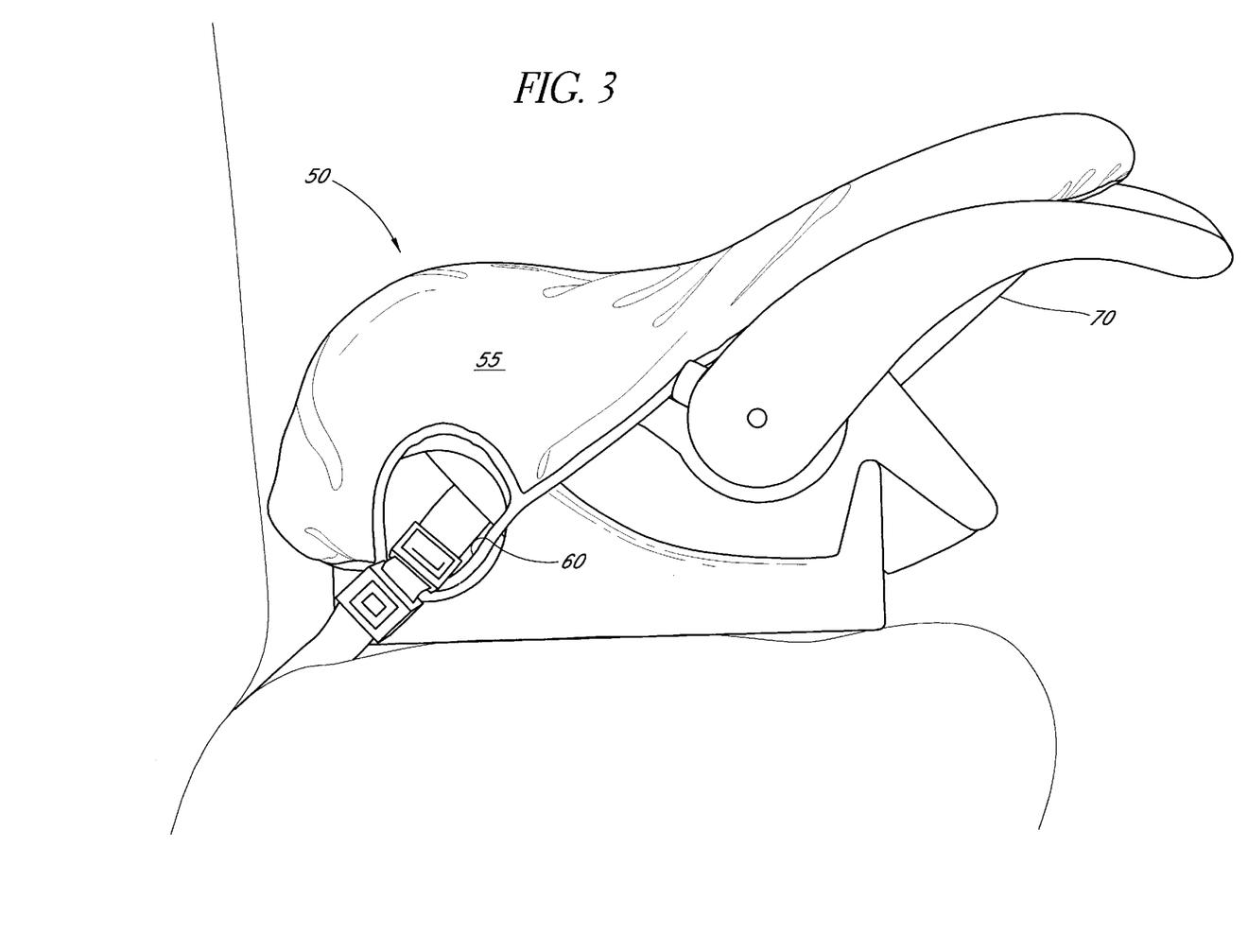
FIG. 3 is a right side view of the covering of FIG. 1, fastened to a typical childien's car seat.

The main body portion 52 is further provided in the front lateral portions of the sidewall 55 with lap restraint belt openings 60, as shown in FIGS. 3–5. The lap restraint belt openings 60 have an approximately semicircular shape on the side thereof which borders the main body portion 52; the remainder of the outer boundary of the lap restraint belt openings 60 is formed by the elastic attaching portion 62. The lap restraint belt openings 60 are large enough to accommodate various automobile lap restraint belts when the covering 50 is attached to a children's car seat. The semicircular portion of the lap restraint belt openings 60 preferably have a diameter approximately within a range of about 1–7 inches (2.54–17.8 cm), more preferably within a range of about 1.5–5 inches (3.81–12.7 cm), and most preferably within a range of about 2–3 inches (5.08–7.62 cm). The fabric at the edges of the lap restraint belt openings 60 may be rolled, serged, looped, trimmed with a contrasting fabric, finished in any other suitable manner, or left unfinished.

As shown in FIGS. 1 and 4-6, the covering 50 is also provided with two blanket flap portions 54, which are attached to main body portion 52 along longitudinal lines at an interior part near the lateral sides of the main body portion 52. In particular, the flaps 54 attach to the main body portion 52 at a lateral side arm rest of the seating device 70 (see FIGS. 1 and 2). In the preferred embodiment, the blanket flap portions 54 are attached to the front two-thirds of main body portion 52. That is to say, the blanket flap portions 54 are attached closer to the feet of the child when seated.

Furthermore, the attachment of the main body portion 52 to the blanket flap portions 54 defines, in part, the sidewall portion 55 of the main body portion 52 that is gathered to define a pocket sized and shaped to fit over and cover a child's seating device. In the preferred embodiment, the blanket flap portions 54 are attached to the main body portion 52 by sewing; however, the skilled artisan will readily appreciate that other mechanisms may be employed to attach the blanket flap portions 54 without departing from the spirit and scope of the present invention. For example, ties, buttons, snaps, zippers, hook and loop material, or the like may be employed. Furthermore, in the preferred embodiment, two blanket flap portions 54 are provided at the lateral sides; however, this is not necessarily so limited, and one or more such blanket flap portions 54 may be provided. Additionally, in the preferred embodiment, the blanket flap portions 54 are attached toward the front portion of main body portion 52 that covers the feet of the child. However, this is not necessarily so limited, and the skilled artisan will readily appreciate that other attachment arrangements are possible without departing from the scope and spirit of the present invention. For example, the blanket flap portions 54 may be attached toward the rear portion of main body portion 52, toward the child's head, or separate blanket flap portions 54 may be provided at the feet and head of the seated child.

The blanket flap portions 54 are of a size sufficient to overlap and cover a seated child when the blanket flap portions 54 are folded inward after the child has been placed in a seating device to which the covering 50 has been attached. Furthermore, in the preferred embodiment, the blanket flap portions 54 have an approximately rectangular shape and extend frontwardly beyond the main body portion 52 in the direction of the feet of a child seated in the seating device to cover the feet when inwardly folded (see FIG. 2). When outwardly folded, these blanket flap portions 54 hang down at the sides of the seating device (see FIG. 1). The blanket flap portions 54 should be of a size sufficient to provide overlap when folded inwardly; concretely, the blanket flap portions 54 preferably have a size within a range of about 16–34 inches by about 8–20 inches (40.6–86.4 cm by 20.3–50.8 cm), more preferably within a range of about 19–31 inches by about 10–18 inches (48.3–78.7 cm by 25.4–45.7 cm), and most preferably within a range of about 22–28 inches by about 12–16 inches (55.9–71.1 by 30.5–40.6 cm). Furthermore, stabilizing elements, such as hook and loop materials, buttons, snaps, zippers, or ties, can be provided on the blanket flap portions 54 to stabilize the position of the blanket flap portions 54 once they have been positioned so as to cover the seated child.

The process of attaching the main body portion 52 to a children's seating device, placing a child therein, and covering the child with blanket flap portions 54 will now be described. First, the first fastener element 64 is manually disengaged from the second fastener elements 66 and the shoulder harness straps 72, 74 of the seating device 70, which are joined in a Y-configuration at a shield 76, can be simultaneously pulled through one of the shoulder restraint openings 56. It will be understood that the two straps 72, 74 are typically formed by threading a single strap through the shield 76, dividing the single strap into left and right sides. Thus, the shoulder harness straps 72, 74 do not need to be unbuckled from shield 76 in order to thread the strap through the shoulder restraint opening 56. The shield 76 is also pulled through the shoulder restraint opening 56. The shoulder harness straps 72, 74 thus do not have to be threaded through two separate openings.

After the shoulder harness straps 72, 74 and shield 76 have been inserted through shoulder restraint opening 56, the first fastener element 64 is preferably reengaged with the second fastener elements 66. As shown in FIGS. 1 and 4, the divider portion 63, comprising the first fastener element 64, separates or divides the shoulder harness straps 72, 74 to alleviate chafing and pressure upon the child's neck. The separation of the shoulder harness straps 72, 74 by the divider portion 63 thus guides the straps over the child's shoulders.

Similarly, the crotch buckle 78 of the seating device 70 is aligned with the crotch buckle opening 58 so that the shoulder harness straps 72, 74 can be engaged with the crotch buckle 78.

Next, the main body portion 52 is attached to a seating device 70, such as that shown in FIG. 1. The seating device 70 can comprise a car seat, as shown, a stroller, a swing or an infant carrier. Attachment is accomplished by stretching the attaching portion 62 around the periphery of the seating device 70 so that the pocket of the main body portion 52 covers the seating device 70. The covering 50 is held in place by the elastic band of the attaching portion 62. Alternatively, the covering 50 may be attached by first turning the main body portion 52 inside out, then positioning the rear peripheral portion of the attaching portion 62 at the rear peripheral portion of the seating device, then progressively turning the main body portion 52 the right way out so that it progressively covers the seating device, like putting on a sock. Desirably, the main body portion 52 is sized and shaped to conform to the seating device 70, including seat portion, back and arm rests. The side of the covering 50 that faces the seating device 70 during this process is shown in FIGS. 4 and 5.

It is also possible to carry out the process of disengaging the first fastener element 64 from the second fastener elements 66 inserting the shoulder harness straps 72, 74 and the shield 76 through the shoulder restraint opening 56, and re-engaging the first fastener element 64 with the second fastener elements 66, after attaching the main body portion 52 to the seating device 70. Performing the process in this order, however, is more difficult.

Next, the child is placed into the seating device 70 which has been covered by the covering 50, the shoulder harness straps 72, 74 are engaged with the crotch buckle 78, and the child is thus secured within the seating device 70. The child thus has the main body portion 52, comprising a soft, pliable material, between it and the seating device 70. The skilled artisan will readily appreciate that the process of securing a child within the seating device 70 covered with the covering 50 is substantially the same when a seating device 70 for somewhat older children is employed, in which the shoulder harness straps 72, 74 are connected in a Y-configuration by a buckle rather than by shield 76.

Figure 2:
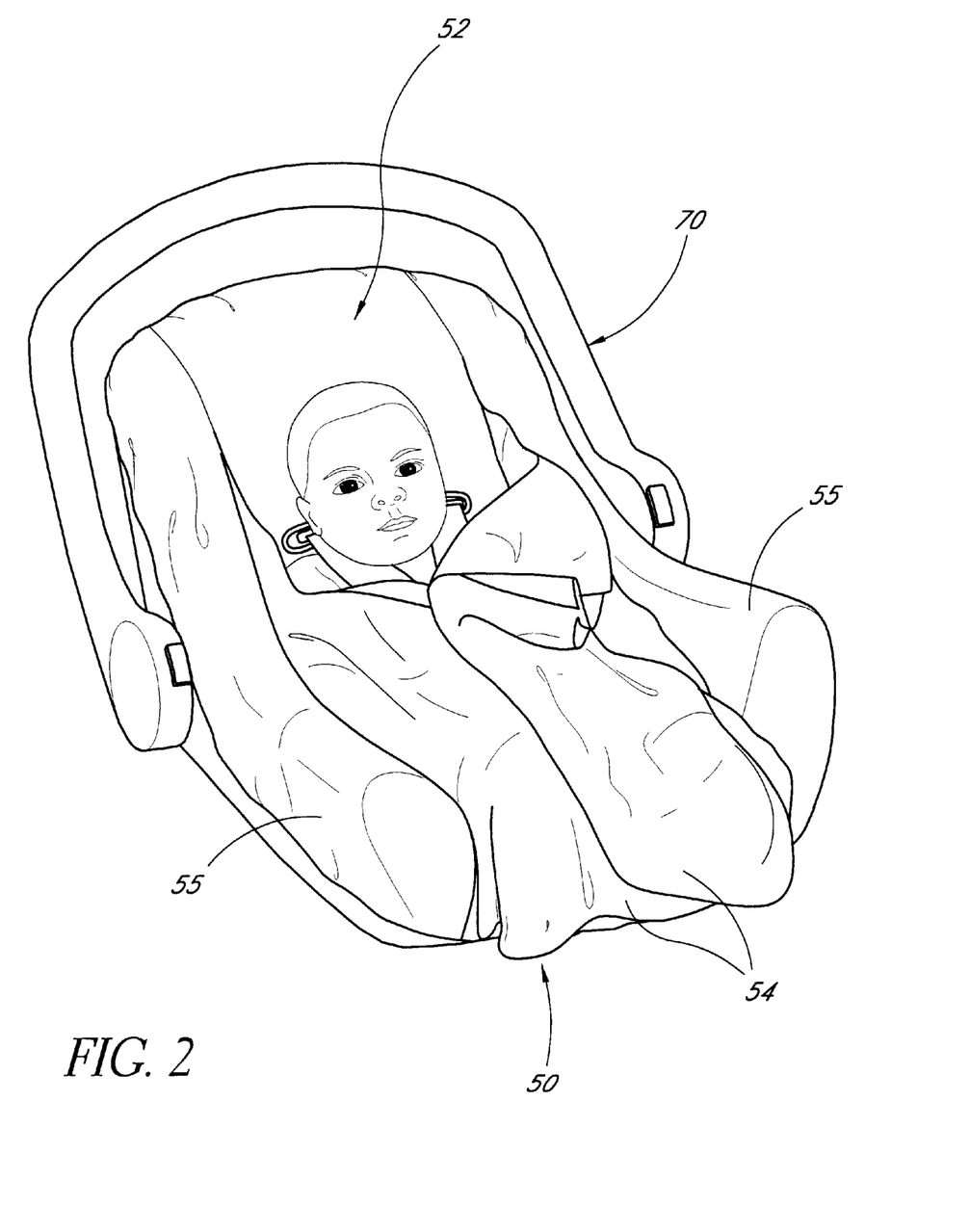
FIG. 2 shows an infant seated in the infant carrier device with the covering of FIG. 1 installed and the blanket flap portions folded inwardly to cover the body of the infant.

Finally, the blanket flap portions 54 are folded over the child in an overlapping fashion to cover the child and insulate it from the outside air, as shown in FIG. 2. Since the blanket flap portions 54 are attached to the main body portion 52, there is less likely to be a gap in the blankets through which the outside air can pass when compared with simply covering the child with a separate blanket.

As noted above, although two blanket flap portions 54 are provided in the preferred embodiment, one, three or more blanket flap portions 54 may be provided, and the skilled artisan will readily appreciate that this is within the spirit and scope of the present invention. For example, if one blanket flap portion 54 is provided, this may be folded across the body of the child and tucked in at the other side. Furthermore, when stabilizing elements, such as hook and loop materials, buttons, snaps, zippers, or ties, have been provided on the blanket flap portions 54, these may be engaged after covering the seated child in order to stabilize the position of the blanket flap portions 54.

Alternatively, three or more blanket flap portions may be provided. Examples of possible further blanket flap portions include a blanket flap portion attached below the feet of the seated child which is folded upward to cover the feet, and a blanket flap portion attached near the head of the seated child which may be used to stabilize or cushion the child's head. In any case, the flap portions are preferably attached at an interior portion of the main body portion, allowing the sidewall portion to extend downwardly and facilitate attachment to the seating device.

While the preferred embodiment is described as having the blanket flaps 54 attached to an interior portion of the main body 52, the skilled artisan will appreciate that the same resulting structure can be obtained when the main body portion is formed of multiple pieces of fabric joined at seams. Alternatively, a single sheet of material can form the upper portion of the covering over the seat, as well as the flaps, while an annular sidewall is attached thereto at a seam.

Advantageously, the child is comfortably surrounded by the main body portion 52 (from below) and the blanket flaps 54 (from above). At the same time, the pocket formed by main body portion 52 facilitates rapid and secure attachment to the child seat 70.

Although the foregoing invention has been described in terms of certain preferred embodiments, other embodiments will become apparent to those of ordinary skill in the art in view of the disclosure herein. Accordingly, the present invention is not intended to be limited by the recitation of preferred embodiments, but is intended to be defined solely by reference to the appended claims.

We claim:

1. A covering for use with a child's seating device, the covering comprising:

a main body portion including a sidewall portion extending downwardly to surround and attach to the seating device; and at least one blanket flap portion provided at an interior part of the main body portion, the blanket flap portion being foldably coupled to the main body portion and sized to cover at least a portion of a child seated in the seating device when the blanket flap portion is inwardly folded, wherein the covering is sized to fit over a children's car seat, the covering is provided with at least one shoulder restraint opening sized to receive a shoulder restraint of a seating device, and the main body portion is additionally provided with a divider portion extending from above the shoulder restraint opening to below the shoulder restraint opening, the divider portion being releasably coupled to the main body portion to divide the shoulder restraint opening into two approximately equally sized openings when the divider portion is coupled to the main body portion.

2. The covering of claim 1, wherein the blanket flap portion is coupled to the main body portion at a lateral side arm portion of the seating device when the covering is mounted on the seating device.

3. The covering of claim 1, wherein the main body portion includes an elastic band at a periphery thereof.

4. The covering of claim 1, wherein the blanket flap portion is foldably sewn to the main body portion.

5. The covering of claim 1, wherein the blanket flap portion extends outwardly beyond the main body portion in a direction the child's feet extend when seated in the seating device.

6. The covering of claim 1, wherein the main body portion is additionally provided with a crotch buckle opening sized to receive a crotch buckle therethrough.

7. The covering of claim 1, wherein the main body portion is additionally provided with two lap restraint belt openings sized to receive an automobile lap restraint belt therethough.

8. The covering of claim 1, wherein the divider portion comprises a first fastener element attached at one end thereof to the main body portion, and the main body portion is provided with at least one mating second fastener element.

9. The covering of claim 8, wherein the first fastener element is a hook fastener and the second fastener element is a loop fastener.

10. A covering for use with a child's seating device, the covering comprising:

a main body portion sized to fit over and cover the seating device, the main body portion being provided with at least one shoulder restraint opening sized to receive a shoulder restraint of the seating device therethrough, a crotch buckle opening sized to receive a crotch buckle therethrough, two lap restraint belt openings sized to receive an automobile lap restraint belt therethrough, and a divider portion extending from above the shoulder restraint opening to below the shoulder restraint opening, the divider portion being releasably coupled to the main body portion to divide the shoulder restraint opening into two openings when the divider portion is coupled to the main body portion; and two blanket flap portions attached at opposite lateral sides of an interior part of the main body portion, each of the blanket flap portions including a downward extension unattached to the main body portion for covering a child's feet.

* * * * *